United States Patent
Golab et al.

(10) Patent No.: US 7,705,512 B2
(45) Date of Patent: Apr. 27, 2010

(54) DYNAMOELECTRIC MACHINE CONDUCTOR

(75) Inventors: Wojciech Golab, Fishers, IN (US); Gustavo Sumcad, Fishers, IN (US)

(73) Assignee: Remy International, Inc., Anderson, IN (US)

( * ) Notice: Subject to any disclaimer, the term of this patent is extended or adjusted under 35 U.S.C. 154(b) by 217 days.

(21) Appl. No.: 11/544,081

(22) Filed: Oct. 6, 2006

(65) Prior Publication Data

US 2008/0084132 A1    Apr. 10, 2008

(51) Int. Cl.
*H02K 13/00*    (2006.01)

(52) U.S. Cl. ...................... 310/249; 310/239

(58) Field of Classification Search .......... 310/239–253
See application file for complete search history.

(56) References Cited

U.S. PATENT DOCUMENTS

| | | |
|---|---|---|
| 3,745,393 A | 7/1973 | Spors |
| 4,221,046 A | 9/1980 | Hayes |
| 4,246,508 A | 1/1981 | Zimmer |
| 4,254,353 A | 3/1981 | Matsuda |
| 4,266,155 A | 5/1981 | Niemela |
| 4,293,789 A | 10/1981 | King |
| 4,296,346 A | 10/1981 | Ooki et al. |
| 4,297,605 A | 10/1981 | Tak |
| 4,311,936 A | 1/1982 | Ozaki et al. |
| 4,329,611 A | 5/1982 | Ohmstedt et al. |
| 4,329,612 A | 5/1982 | Averill |
| 4,338,538 A | 7/1982 | Major |
| 4,340,831 A | 7/1982 | Kuhlmann et al. |
| 4,340,832 A | 7/1982 | Cheetham et al. |
| 4,355,254 A | 10/1982 | Oki et al. |
| 4,356,420 A | 10/1982 | Mercuzot |
| 4,357,588 A * | 11/1982 | Leach et al. ............... 337/160 |
| 4,366,403 A | 12/1982 | Simpson et al. |
| 4,366,404 A | 12/1982 | Ziegler |
| 4,375,040 A | 2/1983 | Sauerwein |
| 4,381,468 A | 4/1983 | Adam et al. |
| 4,396,850 A | 8/1983 | Herr |

(Continued)

FOREIGN PATENT DOCUMENTS

| | | |
|---|---|---|
| EP | 0706727 | 4/1996 |
| EP | 0835539 | 4/1998 |
| GB | 2028005 | 2/1980 |
| WO | WO9530269 | 11/1995 |
| WO | WO2005/099049 A1 | 10/2005 |

*Primary Examiner*—Quyen Leung
*Assistant Examiner*—Alex W Mok
(74) *Attorney, Agent, or Firm*—Cantor Colburn LLP

(57) ABSTRACT

A dynamoelectric machine conductor includes a bus including a central portion, a first connectable site of the central portion connectable with a first conductor and a first arm having a second electrically connectable site connectable with a second conductor. A first fused portion of the first arm located between the first connectable site and the second connectable site, the first fused portion being electrically interruptible to open a circuit between the first connectable site and the second connectable site. A second arm having a third connectable site connectable with a third conductor, and a second fused portion of the second arm located between the first connectable site and the third connectable site. The second fused portion being electrically interruptible to open a circuit between the first connectable site and the third connectable site.

16 Claims, 10 Drawing Sheets

U.S. PATENT DOCUMENTS

| | | |
|---|---|---|
| 4,401,908 A | 8/1983 | Cabaussel |
| 4,404,487 A | 9/1983 | Nimura |
| 4,471,254 A | 9/1984 | Yamada et al. |
| 4,475,053 A | 10/1984 | Mayer |
| 4,559,465 A | 12/1985 | Gagneux |
| 4,590,398 A | 5/1986 | Nagamatsu |
| 4,602,181 A | 7/1986 | Dietrich et al. |
| 4,613,781 A | 9/1986 | Sanders |
| 4,625,136 A | 11/1986 | Kipke |
| 4,673,836 A | 6/1987 | Akiyama et al. |
| 4,673,837 A | 6/1987 | Gingerich et al. |
| 4,673,838 A | 6/1987 | Takagi et al. |
| 4,694,214 A | 9/1987 | Stewart, Sr. |
| 4,698,540 A | 10/1987 | McKee |
| 4,754,184 A | 6/1988 | Morikane et al. |
| 4,774,430 A | 9/1988 | Rodriguez et al. |
| 4,785,214 A | 11/1988 | Mummert |
| 4,800,312 A | 1/1989 | Wacek et al. |
| 4,800,313 A | 1/1989 | Warner et al. |
| 4,835,432 A | 5/1989 | De Pasquale |
| 4,843,274 A | 6/1989 | Paisley |
| 4,845,396 A | 7/1989 | Huber |
| 4,851,730 A | 7/1989 | Fushiya et al. |
| 4,855,631 A | 8/1989 | Sato et al. |
| 4,868,441 A | 9/1989 | Bulick |
| 4,876,475 A | 10/1989 | Smith |
| 4,893,043 A | 1/1990 | Baines |
| 4,893,106 A * | 1/1990 | Goldstein et al. ............ 337/159 |
| 4,916,347 A | 4/1990 | Pillerel |
| 4,926,078 A | 5/1990 | Isozumi et al. |
| 4,963,779 A | 10/1990 | Lentino et al. |
| 4,983,873 A | 1/1991 | Tanaka et al. |
| 4,990,811 A | 2/1991 | Nakata et al. |
| 4,994,701 A | 2/1991 | Bulick |
| 5,004,943 A | 4/1991 | Gagneux |
| 5,019,741 A | 5/1991 | Fukui et al. |
| 5,039,898 A | 8/1991 | Shiina |
| 5,043,619 A | 8/1991 | Kartman, Jr. |
| 5,059,846 A | 10/1991 | Concannon |
| 5,103,131 A | 4/1992 | Sekine |
| 5,113,106 A | 5/1992 | Schmid |
| 5,138,212 A | 8/1992 | Wong et al. |
| 5,148,073 A * | 9/1992 | Tamura ...................... 310/239 |
| 5,159,221 A | 10/1992 | Miyazaki et al. |
| 5,159,222 A | 10/1992 | Southall |
| 5,162,688 A | 11/1992 | Bouton |
| 5,245,241 A | 9/1993 | Gotoh |
| 5,248,910 A | 9/1993 | Yockey et al. |
| 5,252,878 A * | 10/1993 | Spellman et al. ............. 310/239 |
| 5,256,925 A | 10/1993 | Cutsforth |
| 5,280,212 A | 1/1994 | Oba |
| 5,289,070 A | 2/1994 | Shiroyama et al. |
| 5,373,210 A | 12/1994 | Baer et al. |
| 5,373,278 A * | 12/1994 | Saulgeot et al. ............. 337/255 |
| 5,397,952 A | 3/1995 | Decker et al. |
| 5,402,027 A | 3/1995 | Strobl |
| 5,414,318 A | 5/1995 | Shimizu et al. |
| 5,440,186 A | 8/1995 | Forsell et al. |
| 5,444,320 A | 8/1995 | Clark et al. |
| 5,463,264 A | 10/1995 | Koenitzer |
| 5,495,134 A | 2/1996 | Rosenblum |
| 5,506,461 A | 4/1996 | Okabe |
| 5,532,536 A | 7/1996 | Gaspar |
| 5,539,264 A | 7/1996 | Kuragaki et al. |
| 5,610,467 A | 3/1997 | Shiah et al. |
| 5,621,262 A | 4/1997 | Han |
| 5,642,012 A | 6/1997 | Boggs, III |
| 5,644,182 A | 7/1997 | Rawls |
| 5,648,695 A | 7/1997 | Yamaguchi et al. |
| 5,661,357 A | 8/1997 | Iijima |
| 5,686,775 A | 11/1997 | Veil et al. |
| 5,689,148 A * | 11/1997 | Rubinchik .................. 310/239 |
| 5,717,271 A | 2/1998 | Aoki et al. |
| 5,744,891 A | 4/1998 | Okuyama et al. |
| 5,747,911 A | 5/1998 | Kikly |
| 5,753,992 A | 5/1998 | Avitable et al. |
| 5,773,906 A | 6/1998 | Mukai et al. |
| 5,773,907 A | 6/1998 | Rubinchik |
| 5,780,952 A * | 7/1998 | Lau .......................... 310/239 |
| 5,808,393 A | 9/1998 | Penfold et al. |
| 5,808,394 A | 9/1998 | Bruhn |
| 5,818,142 A | 10/1998 | Edleblute et al. |
| 5,895,995 A | 4/1999 | Soh |
| 5,905,323 A | 5/1999 | Clemente |
| 5,907,207 A | 5/1999 | Peot et al. |
| 5,942,819 A | 8/1999 | Burgess et al. |
| 5,949,175 A | 9/1999 | Cummins |
| 5,952,763 A | 9/1999 | Bruhn |
| 5,977,682 A | 11/1999 | Clemente |
| 5,977,683 A | 11/1999 | Scheele et al. |
| 6,005,323 A | 12/1999 | Morimoto et al. |
| 6,011,341 A * | 1/2000 | Toya et al. .................. 310/239 |
| 6,011,342 A | 1/2000 | Walther |
| 6,031,313 A | 2/2000 | Sugai et al. |
| 6,066,907 A | 5/2000 | Matsushima et al. |
| 6,133,665 A | 10/2000 | Prell et al. |
| 6,169,351 B1 | 1/2001 | Bohart et al. |
| 6,198,191 B1 | 3/2001 | Chen et al. |
| 6,215,211 B1 | 4/2001 | Harris et al. |
| 6,246,144 B1 | 6/2001 | Hockaday et al. |
| 6,246,145 B1 | 6/2001 | Morimoto et al. |
| 6,271,615 B1 | 8/2001 | Morimoto et al. |
| 6,326,716 B1 | 12/2001 | Niimi et al. |
| 6,356,004 B1 | 3/2002 | Porter et al. |
| 6,404,093 B1 | 6/2002 | Bastide et al. |
| 6,459,188 B1 | 10/2002 | Lombardo et al. |
| 6,548,934 B1 | 4/2003 | Porter et al. |
| 6,555,943 B2 | 4/2003 | Walther et al. |
| 6,608,423 B2 | 8/2003 | Tam |
| 6,661,330 B1 * | 12/2003 | Young ........................ 337/297 |
| 6,664,700 B2 | 12/2003 | Yamada et al. |
| 6,664,701 B1 | 12/2003 | Ortt et al. |
| 6,680,556 B2 | 1/2004 | Menz et al. |
| 6,700,290 B1 | 3/2004 | Baines |
| 6,700,291 B2 | 3/2004 | Uchida et al. |
| 6,703,754 B1 | 3/2004 | Finkenbinder et al. |
| 6,724,122 B2 | 4/2004 | Frey et al. |
| 6,731,040 B1 | 5/2004 | Tanaka et al. |
| 6,731,042 B1 | 5/2004 | Bank et al. |
| 6,744,170 B1 | 6/2004 | Du et al. |
| 6,750,585 B2 | 6/2004 | You |
| 6,768,243 B1 | 7/2004 | Yamazaki et al. |
| 6,777,849 B2 | 8/2004 | Fujita et al. |
| 6,787,962 B2 | 9/2004 | Yagi et al. |
| 6,798,109 B2 | 9/2004 | Ortt et al. |
| 6,809,455 B2 | 10/2004 | Vaucher |
| 6,812,613 B1 | 11/2004 | Reynard |
| 6,822,366 B2 | 11/2004 | Strobl |
| 6,822,367 B1 | 11/2004 | Uchida et al. |
| 6,838,802 B2 | 1/2005 | Tekawade |
| 6,856,066 B2 | 2/2005 | Takahashi et al. |
| 6,864,615 B2 | 3/2005 | Vacheron et al. |
| 6,867,528 B2 | 3/2005 | Inoue et al. |
| 6,873,083 B2 | 3/2005 | Ko et al. |
| 6,885,126 B2 | 4/2005 | Takahashi et al. |
| 6,909,218 B2 | 6/2005 | Ortt et al. |
| 6,917,135 B1 | 7/2005 | Yu |
| 6,922,003 B2 | 7/2005 | Uchida |
| 6,924,577 B2 | 8/2005 | Southall et al. |
| 6,927,523 B2 | 8/2005 | Okamoto et al. |
| 6,949,861 B1 | 9/2005 | Liao et al. |
| 6,949,862 B2 | 9/2005 | Strobl |
| 6,998,754 B2 | 2/2006 | Nedriga et al. |
| 7,032,290 B2 | 4/2006 | Hirano et al. |

| | | |
|---|---|---|
| 7,034,430 B2 | 4/2006 | Custforth et al. |
| 7,034,431 B2 | 4/2006 | Kapitza et al. |
| 7,049,727 B2 | 5/2006 | Bocka et al. |
| 2001/0006311 A1* | 7/2001 | Niimi et al. .................... 310/71 |
| 2002/0008608 A1* | 1/2002 | Brown et al. ................ 337/290 |
| 2003/0052033 A1* | 3/2003 | Schwester ................... 206/461 |
| 2003/0230952 A1 | 12/2003 | Inoue et al. |
| 2005/0057046 A1* | 3/2005 | Kitagawa et al. .......... 290/38 R |
| 2005/0193841 A1 | 9/2005 | Ahn et al. |
| 2006/0103259 A1 | 5/2006 | Vacheron |
| 2006/0163956 A1* | 7/2006 | Sahashi et al. ............ 310/68 C |
| 2006/0186747 A1 | 8/2006 | Reynard et al. |

* cited by examiner

DYNAMOELECTRIC MACHINE CONDUCTOR

BACKGROUND OF THE INVENTION

Brush holder assemblies in dynamoelectric machines are sometimes attached to a plate. Each of the brush holder assemblies accommodates a brush that may be electrically connected to a flexible conductor. The flexible conductor connected to the brush is routed through a hole or slot in a brush holder of the brush holder assembly. The end of the flexible conductor that is not connected to the brush may be electrically connected to a rigid conductor that sealably extends through a housing of the machine. Preventing the flexible and the rigid conductors from inadvertently shorting out against other conductive components of the dynamoelectric machine that carry alternate electrical potentials than that which is carried by the flexible or rigid conductors, is necessary for the proper operation of the dynamoelectric machine.

Brush holder assemblies typically also include a biasing spring for urging the brushes toward a commutator. The biasing force created by such springs can vary depending upon how the spring is seated against a surface of the brush, for example. Such variations in spring force can have a detrimental affect on the durability of the machine as well as have a detrimental affect on the audible and electrical noise emitted from the machine. It may, therefore, be desirable to minimize variations in brush spring force.

Mechanisms that attach the brush holders to the plates of dynamoelectric machines can also affect the brush spring force. In machines, in which the spring is compressed between the brush and the brush holder, variability in the positional attachment of the brush holder to the plate can affect the contact force of the brush against the commutator. It may therefore be advantageous to minimize the number of features involved in attaching the brush holder to the metal plate.

Another factor that affects not only the durability of the brush holder assembly but the complete dynamoelectric machine is the temperature at which the machine operates. The current that flows through the flexible connectors, brushes, commutator and windings of the machine can influence the operational temperature of the machine with higher currents causing higher operational temperatures. The amount of current that flows is affected by operational conditions of the dynamoelectric machine such as mechanical loading and friction, for example, and is therefore an unavoidable condition, which should be accommodated. Durability failures that result from over temperature operation can require replacement of the entire machine at a considerably higher cost than if only the brush holder assembly required replacement.

Over temperature operation can also result in fires. Some bush holder assemblies use the flexible conductors as fusible links, however, the flexible nature of such conductors may cause them to have a variation in current draw at which the open circuit occurs, resulting in premature failures of the conductors on some devices while permitting overheating on others. It may therefore be desirable to have a failure include an opening of the circuit at a more controlled current level than that which is available with the flexible conductors and to have the brush holder assemblies fail prior to the failure of the complete dynamoelectric machine.

Therefore, the art of brush holder assemblies is in need of simpler and less costly ways to prevent internal electrical short circuits, more reliable spring biasing forces, and integration of fusible links with tight control of overload currents.

BRIEF DESCRIPTION OF THE INVENTION

Disclosed herein relates to a dynamoelectric machine conductor. The conductor comprising, a bus including a central portion, a first connectable site of the central portion connectable with a first conductor. A first arm having a second electrically connectable site connectable with a second conductor. A first fused portion of the first arm located between the first connectable site and the second connectable site, the first fused portion being electrically interruptible to open a circuit between the first connectable site and the second connectable site. A second arm having a third connectable site connectable with a third conductor, and a second fused portion of the second arm located between the first connectable site and the third connectable site. The second fused portion being electrically interruptible to open a circuit between the first connectable site and the third connectable site.

Further disclosed herein is a method that relates to controlling over current in a dynamoelectric machine bus. The method comprising, flowing current through an electric machine bus with a plurality of fused portions. The plurality of fused portions being breakable to open a circuit, and breaking the at least one fused portion of the bus in response to an over current condition.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

Figure 1:
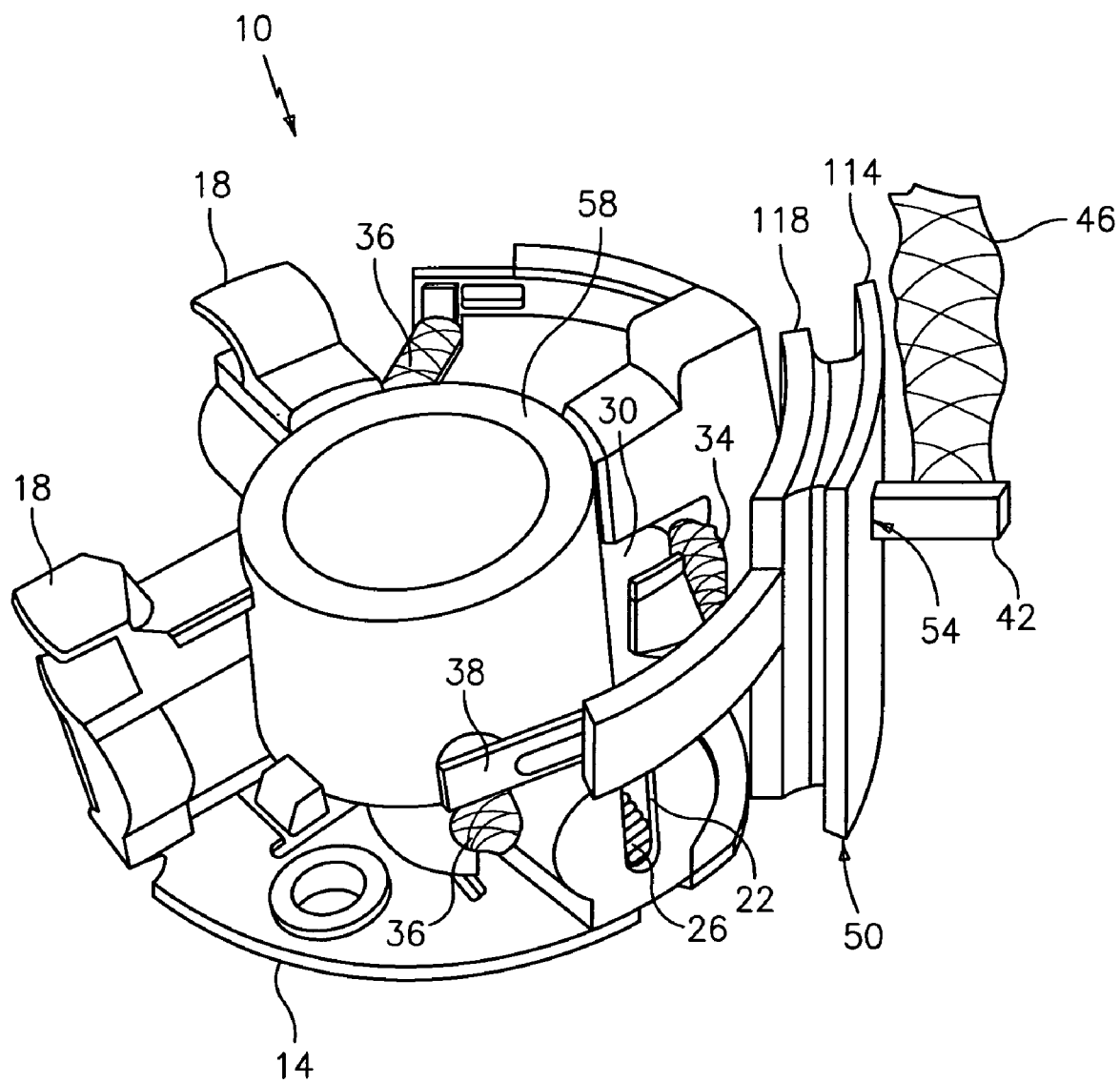
FIG. 1 depicts a perspective view of a brush holder assembly disclosed herein.

Referring to FIG. 1, a perspective view of one embodiment of a brush holder assembly disclosed herein is shown generally at 10. The brush holder assembly 10 includes a base plate 14, to which four brush holders 18 are attached. The brush holders 18 each have a cavity 22 in which a brush biasing member 26, depicted here as a compression spring, and a brush 30 are located. The biasing member 26 is compressed within the cavity 22 to thereby create a biasing force on the brush 30 urging the brush 30 in a radially inward direction. Each brush 30 has a ground flexible conductor 34 or a positive flexible conductor 36 attached thereto to provide an electrical connection to the brush 30. The positive flexible conductors 36, attached to two of the brushes 30 located across from each other on the base plate 14, are electrically connected to a rigid conductor 38, depicted here as a bus bar. The rigid conductor 38 has an arcuate shape with a radially outward protrusion 42 to which an external flexible conductor 46 is electrically attached. A grommet 50 includes an aperture 54, which is slit shaped, through which the protrusion 42 is positioned and sealed. The grommet 50 seals the protrusion 42 to a housing (not shown) of the dynamoelectric machine.

The four brushes 30 are radially inwardly biased towards a rotatable conductor 58, depicted here as a commutator. The brushes 30 make electrical contact with the rotatable conductor 58, which provides electrical current to a rotor of the dynamoelectric machine during operation of the machine. The two brushes 30 not connected to the rigid conductor 38 are instead connected to the base plate 14 through the two ground flexible conductors 34. The base plate 14 may be made of an electrically conductive material such as metal, for example, and is connected to electrical ground of the machine. The rigid conductor 38 is connected to a direct current (DC) source of electrical power such as a battery, for example, through the positive flexible conductor 36.

A dynamoelectric machine using the above described brush holder assembly can convert DC electrical energy into rotational energy and vice versa. In a vehicle starter motor, for example, DC current flows to the motor's rotor through the flexible conductor 46, the rigid conductor 38, the positive flexible conductors 36, and the brushes 30. Simultaneously, the DC current flows from the machine's rotor through the brushes 30, the ground flexible conductors 34, and the base plate 14 to electrical ground. As more rotational energy, through increases in torque, for example, is demanded, more electrical energy, through increases in current, for example, will be drawn.

The current carrying components of a dynamoelectric machine have limits as to how much current they can carry before they fail. Such failures are typically due to overheating that accompanies high current draw. Failures may include increased audible noise, decreased efficiency, shortened durability and even complete inoperability, for example. It may therefore be desirable to implement a fusible link in the machine that will interrupt or open the electrical circuit before more costly failures can occur.

Figure 2:
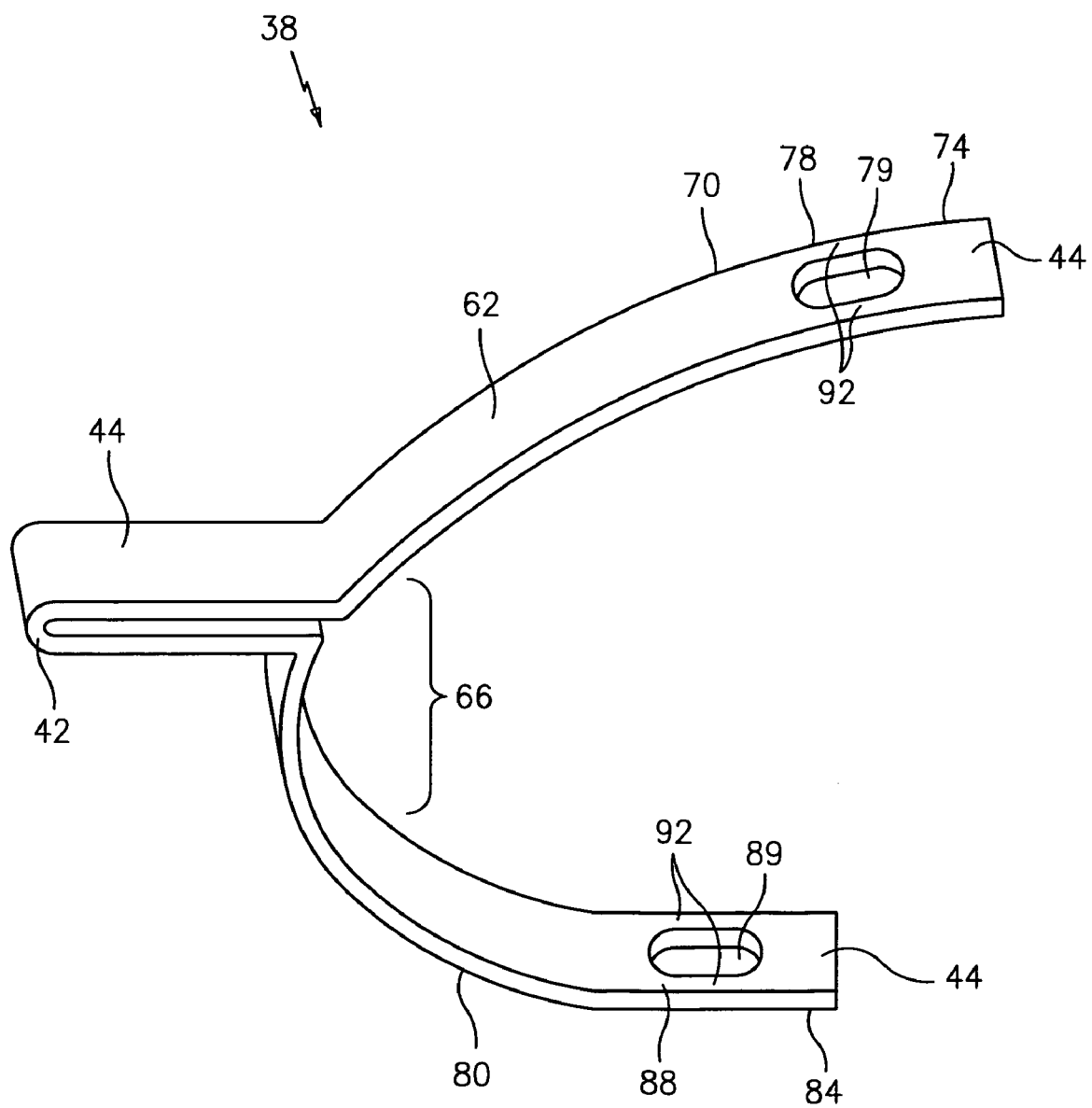
FIG. 2 depicts a perspective view of a rigid conductor disclosed herein.

Referring to FIG. 2 a perspective view of the rigid conductor 38, or bus bar, is shown, which incorporates a fused portion as will now be described in detail. The rigid conductor 38 comprises an arcuate elongated arm 62, formed from metal stamping, with a central portion 66 from which the protrusion 42 extends. The protrusion 42 has the external flexible conductor 46 electrically connected to a connectable site 44 by a method such as welding or soldering (FIG. 1). The rigid conductor 38 extends in opposite directions from the central portion 66, and has a first extension 70 with a first end 74 and a second extension 80 with a second end 84. The first end 74 and the second end 84 each have a positive flexible conductor 36 electrically connected to a connectable site 44 thereon by welding or soldering (FIG. 1). Between the central portion 66 and the end 74 is a first reduced cross sectional area 78. Similarly, between the central portion 66 and the end 84 is a second reduced cross sectional area 88. The reduced cross sectional areas 78 and 88 are formed by orifices 79 and 89 respectively. The orifices 79, 89 leave two thin walled sections 92 of the base material of the rigid conductor 38. The total cross sectional area of each of the reduced cross sectional areas 78, 88 are selected to melt at current loads that do not cause damage to the other current carrying components, thereby creating fused portions and providing overload protection in the rigid conductor 38.

Figure 3:
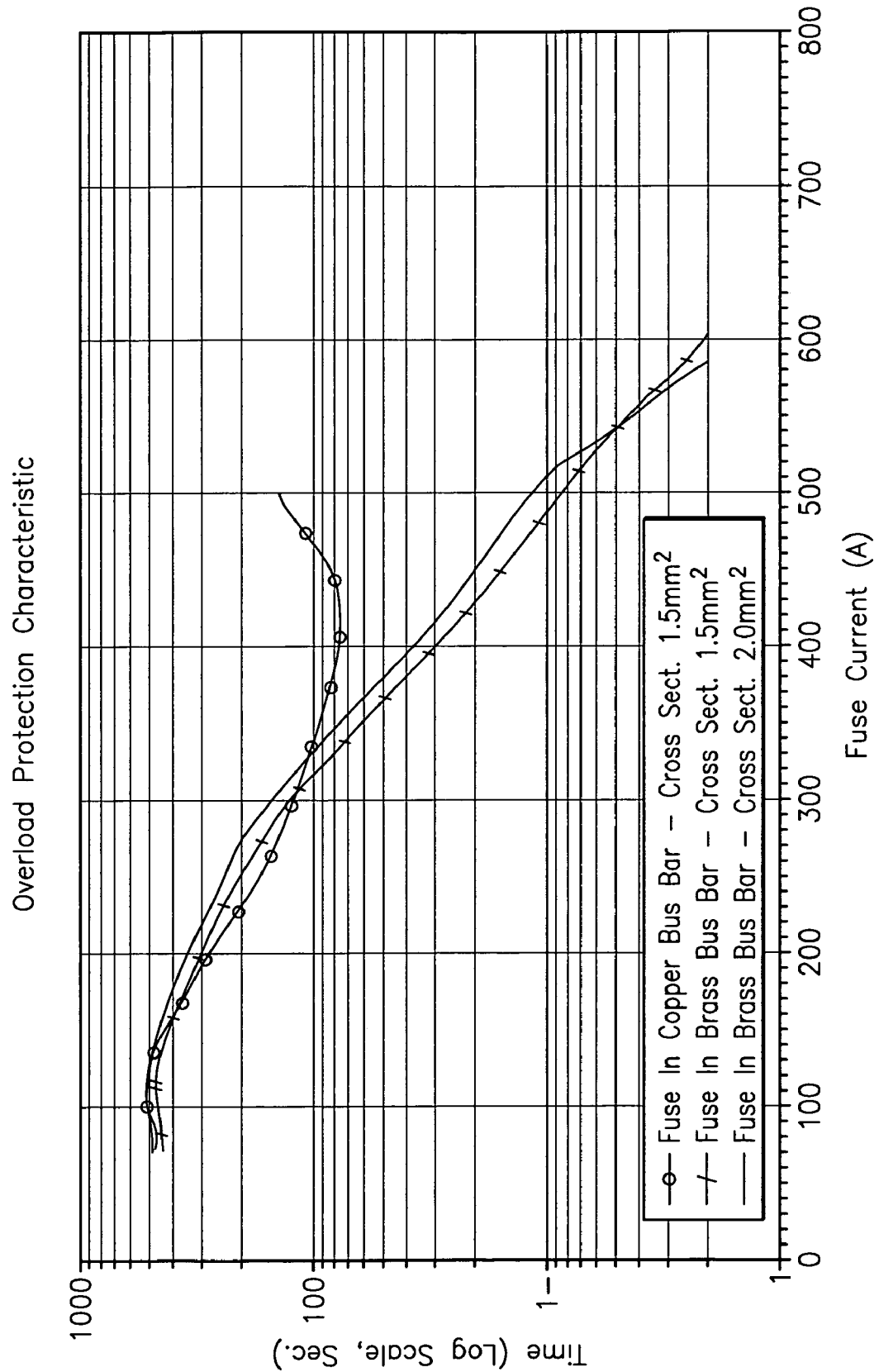
FIG. 3 depicts a graphical relationship of time versus current to electrically interrupt a circuit for different conductors.

The overload protection can have various relationships of time versus current at which the protection is triggered. This relationship is determined in part by the reduced cross sectional areas 78, 88, and in part by the material from which the rigid conductor 38 is manufactured. Referring now to FIG. 3, three examples of time versus current load are graphed. The first line is for a copper bus bar with a 1.5 mm$^2$ cross sectional area, the second line is for a brass bus bar with a 1.5 mm$^2$ cross sectional area, and the third is for a brass bus bar with a 2.0 mm$^2$ cross sectional area. It is, therefore, possible, within limits, to tailor the time versus current load to open the circuit to the specific needs of each application by selection of material and cross sectional loads. Additionally, the reduced cross sectional areas 78, 88 provide a means of more accurately controlling the overload protection than is available using the flexible conductors 34, 36, and 46, for example. As such, the reduced cross sectional areas 78, 88 are selected to melt to an opened circuit at lower current loads than the flexible conductors 34, 36, and 46.

To maintain accurate control of the current load protection it may be desirable to coat the metal of the rigid conductor 38 with plating such as tin, lead tin or silver, for example. By plating the rigid conductor 38, reduction in the cross sectional area of the reduced cross sectional areas 78, 88 due to corrosion, can be significantly slowed thereby maintaining the original reduced cross sectional areas 78, 88, and the corresponding current load protection they afford, for a longer period of time.

Figure 4:
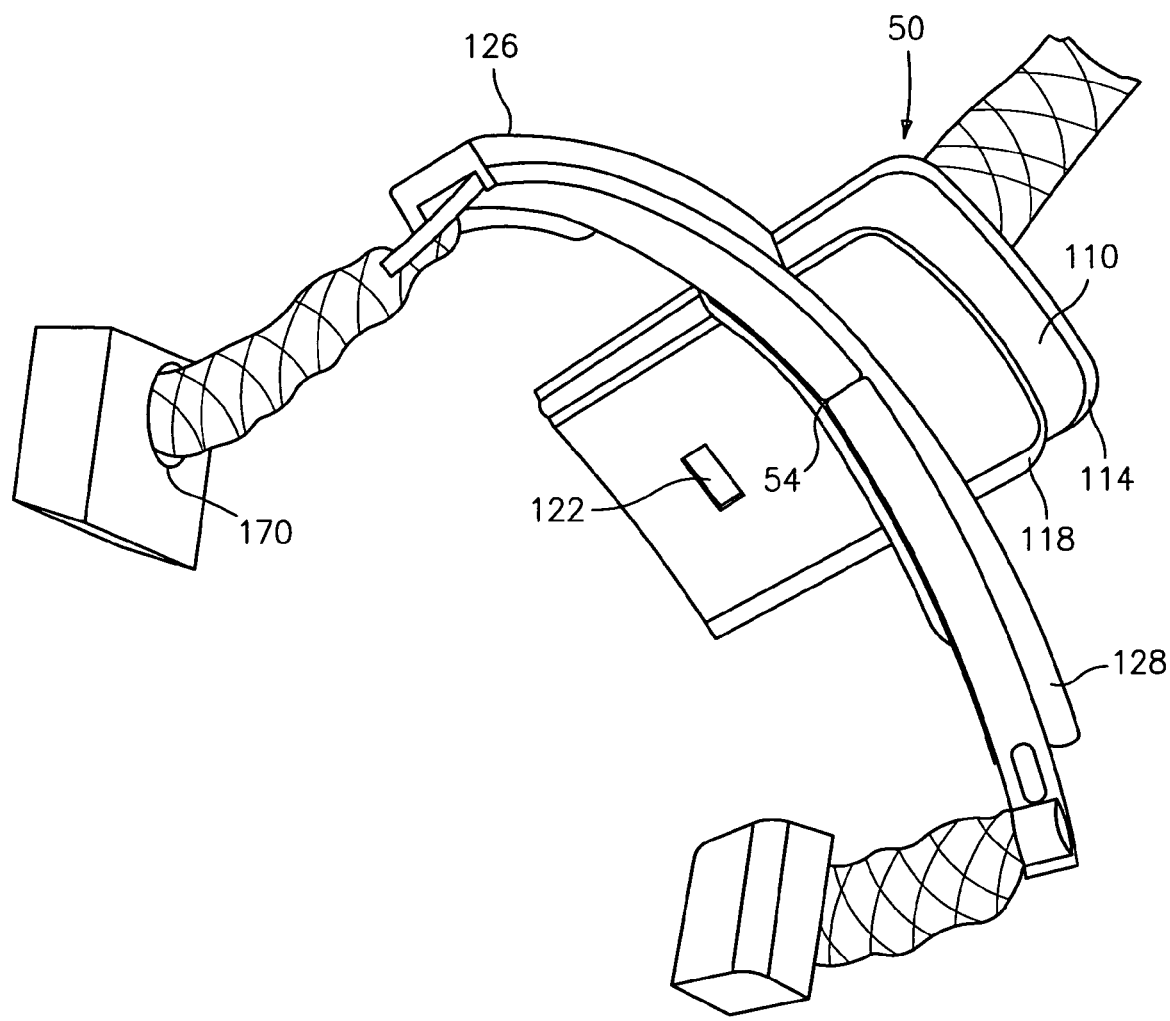
FIG. 4 depicts a perspective view of a grommet disclosed herein.

Referring now to FIG. 4, the grommet 50, which incorporates features to prevent electrical short circuits within the machine, will be described in further detail. The grommet 50 creates a sealable passageway for electrical power from the outside to the inside of the dynamoelectric machine. A body portion 110 of the grommet 50 sealable engages with an opening (not shown) in a rigid surface of the dynamoelectric machine. The body portion 110 is arcuate shaped to match the rigid surface of the machine to which it will be sealed. The body portion 110 includes an outer larger area portion 114 and an inner larger area portion 118 at greater and lesser radial dimensions respectively than the radial dimension coincident with the rigid surface of the machine to thereby lock the grommet 50 in the correct radial position relative to the machine.

A slit shaped aperture 54 extends radially through a central area of the body portion 110 of the grommet 50. The protrusion 42 extends through the aperture 54 with an interference fit that creates a seal between the grommet 50 and the protrusion 42. Thus, the protrusion 42 is positioned to conduct electrical energy from outside the machine to inside the machine through the seal it has with the grommet 50. Sealing the dynamoelectric machine is desirable to prevent incursion of contaminants into the machine that can adversely effect the operation and durability of the machine. A locating notch 122 is formed on an inner surface of the grommet 50 to receive a tab (not shown) on the base plate 14 to fix the grommet axially relative to the machine.

A first projection 126 and a second projection 128 extend from opposite sides of the body portion 110 of the grommet 50. The projections 126 and 128 have a "C" shaped cross section, thereby forming a channel, with the open portion of the "C" shape directed radially inwardly. A recessed portion of the "C" shape of the projections 126, 128 continue, in an uninterrupted fashion, across the body portion 110. The projections 126 and 128 continue the arcuate shape of the body portion 110, from which they extend, and substantially match the arcuate shape and length of the rigid conductor 38. The rigid conductor 38 is located in the arcuate recess in the grommet 50 and the protrusion 42 is sealedly positioned within the aperture 54 thereby rotationally fixing the rigid conductor 38 to the grommet 50. To radially attach the projections 126, 128, of the grommet 50, to the extensions 70, 80, of the rigid conductor 38, optional wings 130, 132, of the grommet 50, located near the ends 74, 84 of the rigid conductor 38 may be employed. A first wing 130 and a second wing 132 extend axially towards one another in opposite directions to partially close the open portion of the "C" shaped projections 126, 128. An opening 134 between the wings 130, 132 is smaller than the axial width of the rigid conductor 38 thereby retaining the ends 74, 84 in the extensions 70, 80. The grommet 50 is made of an elastomer and is therefore elastic to enhance sealablity and to allow it to be flexed from its original shape, if necessary, to assemble it into the rigid surface of the machine. The material of the grommet 50 is electrically nonconductive and the projections 126 and 128 provide insulation to the rigid conductor 38 to prevent shorting of the rigid conductor 38 with components of alternate electrical potential that could otherwise contact the rigid conductor 38 directly.

Although the embodiments described herein incorporate a square "C" shaped cross section other cross sectional shapes could also be utilized while remaining within the scope of the present invention, such as a circular cross section with a slit along a length, for example. Similarly, the opened portion of the "C" shape could be directed axially rather then radially inwardly as disclosed herein.

Figure 5:
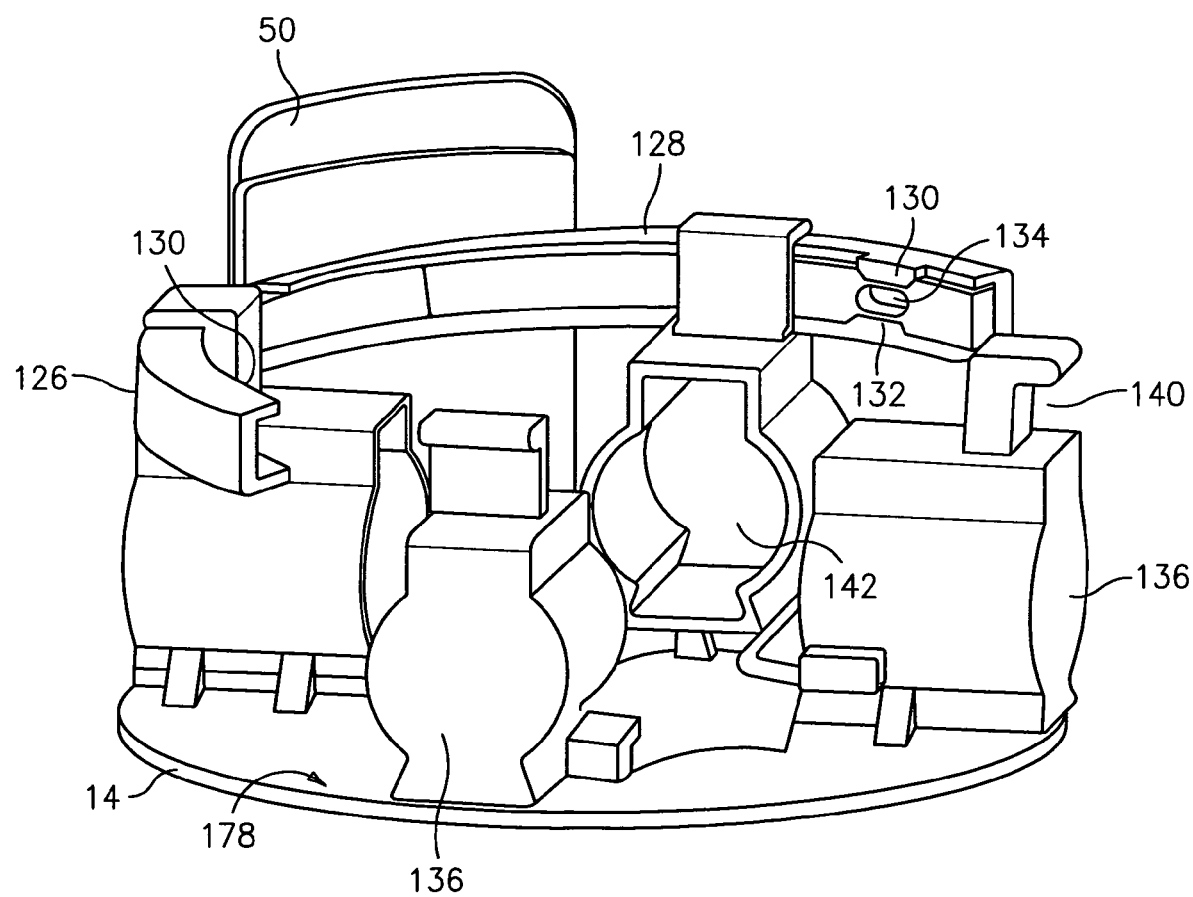
FIG. 5 depicts a perspective view of a partial assembly of a brush holder assembly disclosed herein.

Referring to FIG. 5 the rigid conductor 38 is further prevented from making inadvertent contact with components within the dynamoelectric machine by an interface with brush holders 136. The brush holders 136 are molded, for example by injection molding, from a nonconductive plastic resin. A groove 140 is integrated into the brush holder 136. The groove 140 is formed circumferentially relative to the dynamoelectric machine with the opened portion of the groove directed radially outwardly. The groove 140 is sized to receive the rigid conductor 38 with the projection 126 or 128 covering the rigid conductor 38. A small interference between the walls of the groove and the projections 126, 128 may by used to prevent relative movement of the rigid conductor 38 within the groove 140. It should be noted that other embodiments could have grooves sized to receive the rigid conductor 38 directly without an insulative layer being present. The groove 140 is positioned relative to a cavity 142, slidably receptive of a brush 30, such that the groove 140 and the cavity 142 do not overlap axially at all to thereby allow the full cross sectional shape of the cavity 142 to extend fully to the outer most radial dimension of the base plate 14. Such a construction would allow for maximization of the overall brush 30 length, which may be desirable for reasons such as increased durability, for example.

Figure 6:
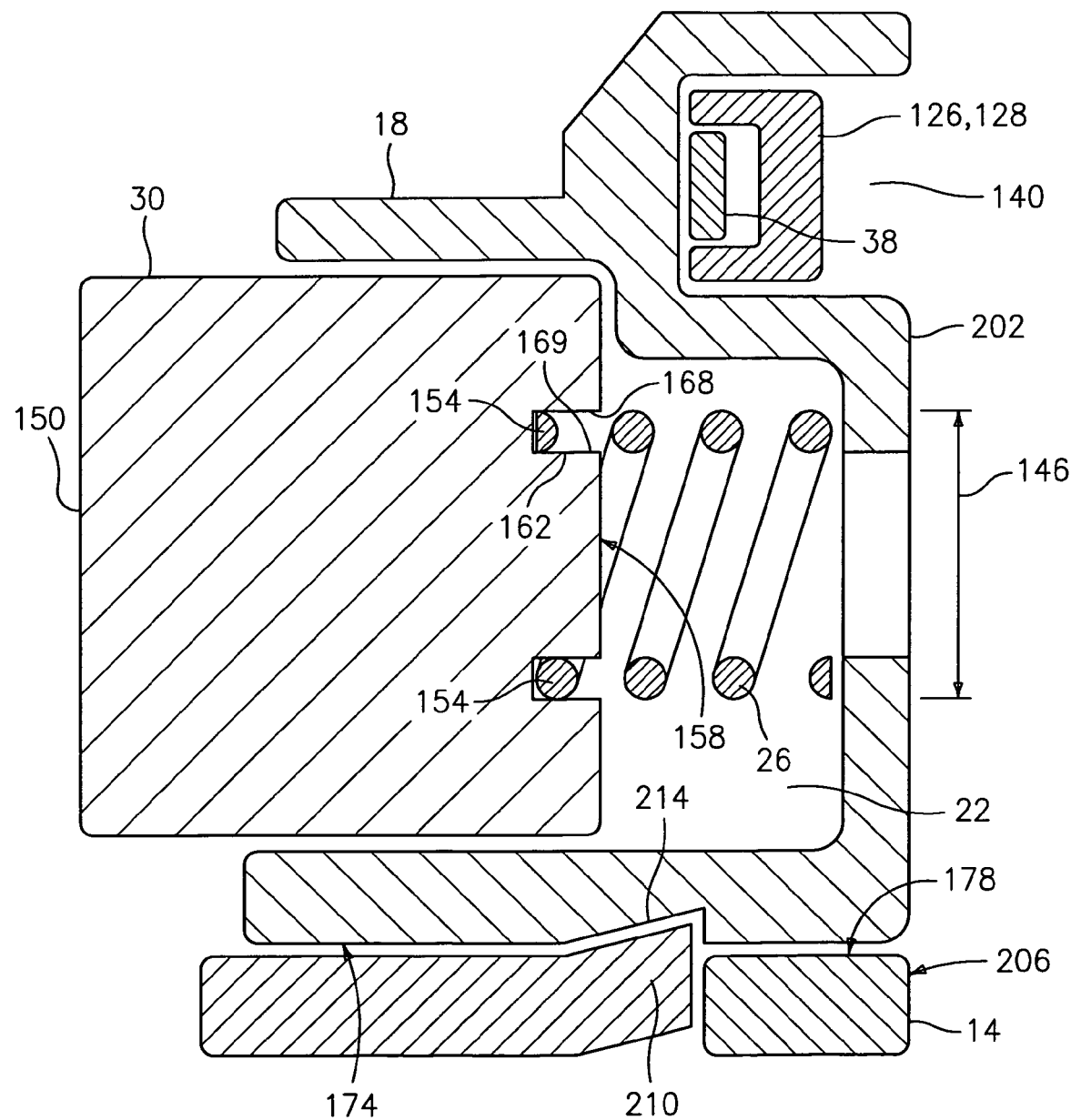
FIG. 6 depicts a partial cross sectional view of a brush and brush holder shown in FIG. 1.

Referring to FIGS. 6 and 1, in an alternate embodiment the groove 140 may partially overlap axially with the cavity 22. Such a partial overlap may permit use of a biasing member 26 with a large diameter 146, such as a compression spring, for example, to be located symmetrically relative to the brush 30. The large diameter 146 of the biasing member 26, and its symmetrical orientation to the brush 30, facilitates even loading of the brush to the rotatable conductor 58 (FIG. 1), which may be advantageous for durability of the brushes 30 and even brush 30 wear. Additionally, by axially extending the groove 140 beyond the axial dimension of the cavity 22, even if only partially, the axial width of the groove 140 can be made longer than if it were to not extend beyond the axial dimension of the cavity 22. A longer axial length of the groove 140 may be desirable to accommodate a rigid conductor 38 with a long axial dimension.

Even loading of the brush 30 to the rotatable conductor 58, as mentioned above, can contribute to long brush 30 life. Even brush loading can also contribute to more consistent and reliable electrical contact between a brush surface 150 and the rotatable conductor 58. In addition to even loading, equal loading force between the multiple brushes 30 that contact the rotatable conductor 58 can have an affect on the quality of the electrical contact and brush durability, with more equal brush forces correlating with improved contact quality and increased durability. Accurately positioning an end 154 of the biasing member 26 that is in contact with the brush 30 may, therefore, be desirable.

Figure 7:
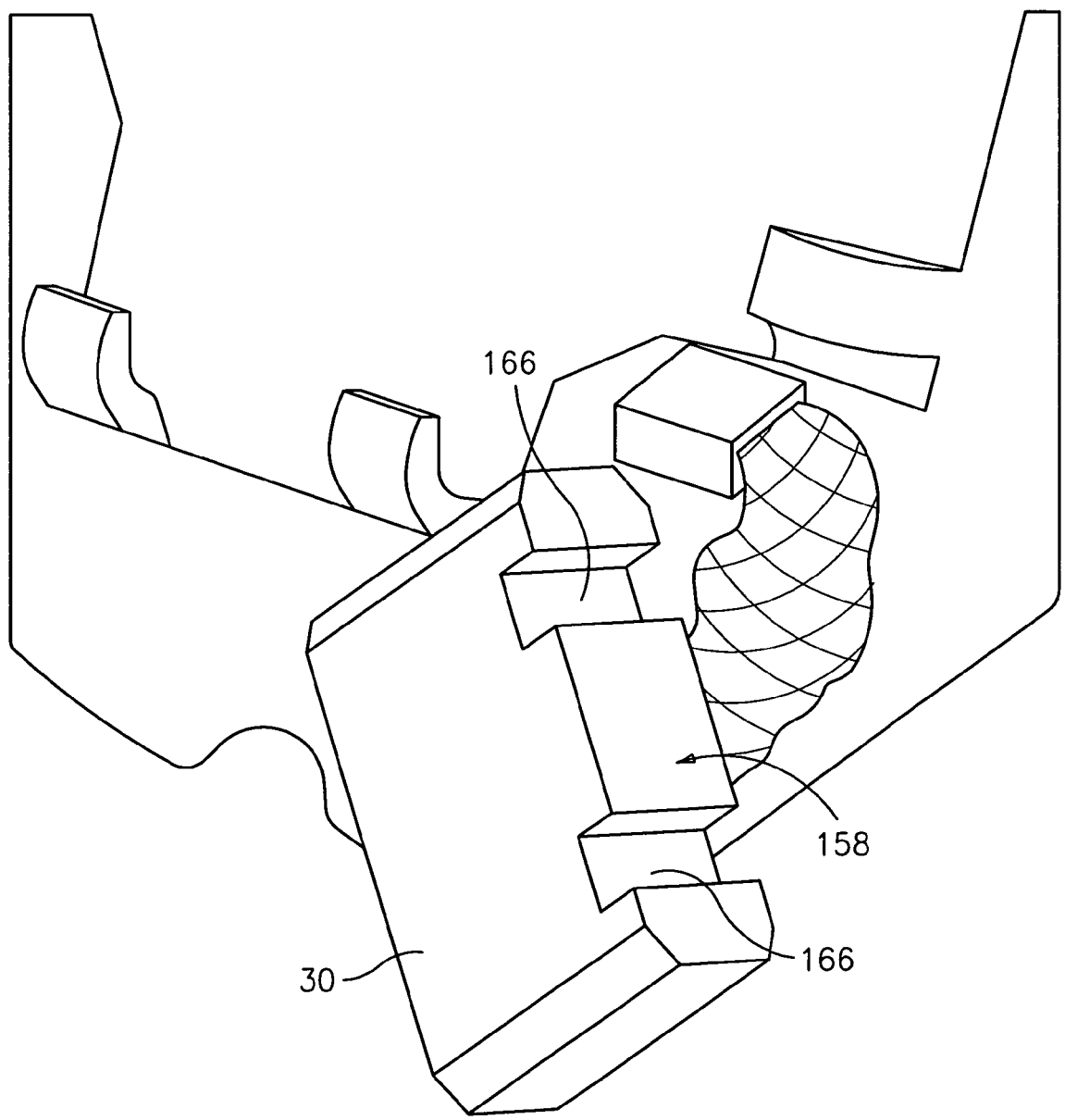
FIG. 7 depicts a perspective view of a brush disclosed herein.

Referring again to FIG. 6, a surface 158 of the brush 30 is contoured to complementarily receive the end 154 of the biasing member 26. The contoured surface 158 may include such features as, a partial hollow cylindrical recess 162, or a pair of grooves 166, for example, which may be parallel to one another, as are shown in FIG. 7. Both the cylindrical recess 162 and the pair of grooves 166 configurations provide alignment of the biasing member 26 to the brush 30 to thereby consistently distribute the force of the biasing member 26 into the brush 30. Additional alignment may be provided by sizing the recess 162 or the pair of grooves 166 such that an outer side wall 168 or an inner side wall 169 or both side walls 168, 169 interfere with the biasing member 26. Such an arrangement may require that the biasing member 26 be flexed to engage the contoured surface 158 thereby providing even greater alignment between the brush 30 and the biasing member 26.

Figure 8:
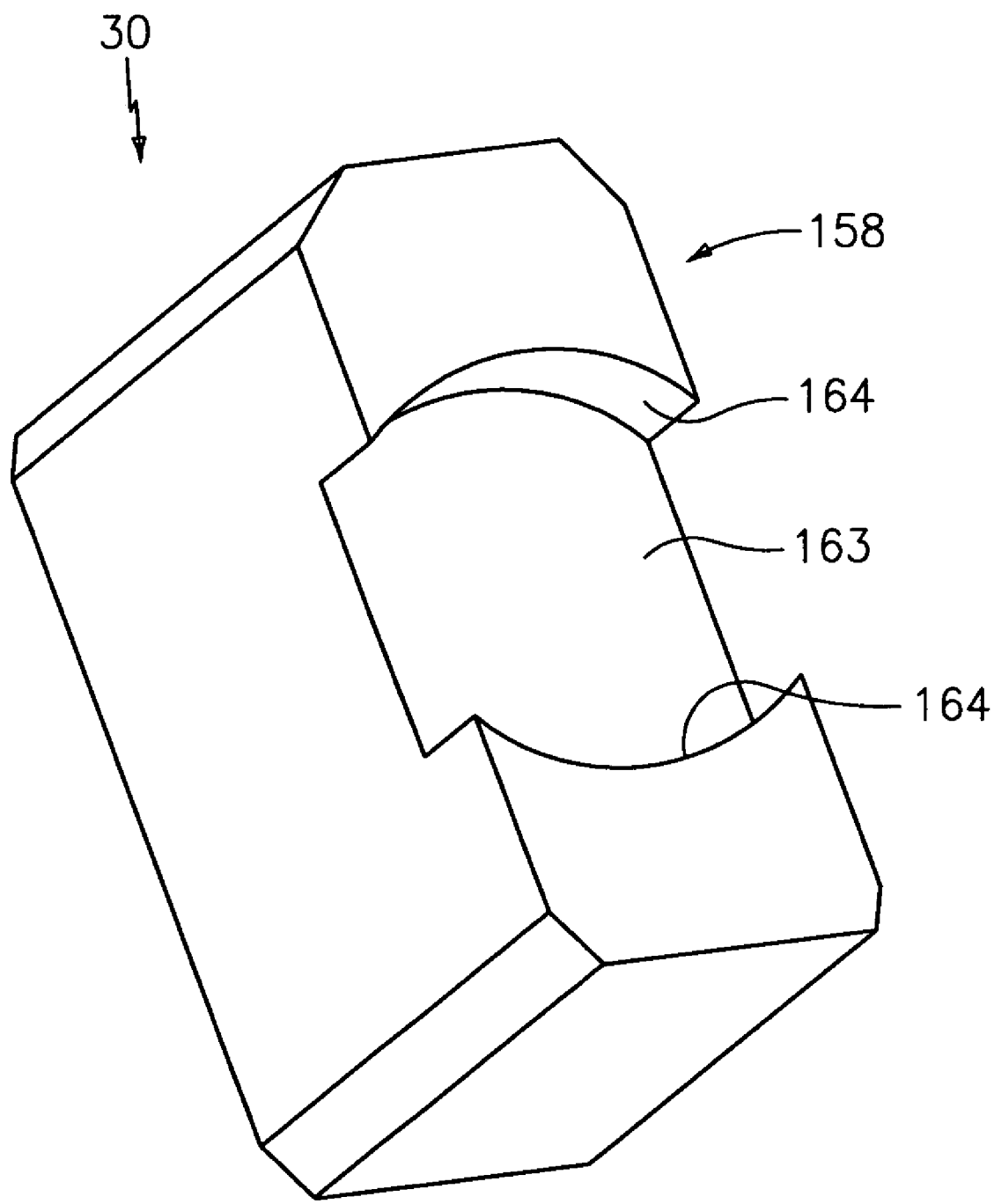
FIG. 8 depicts a perspective view of an alternate brush disclosed herein.

Referring to FIG. 8 in yet another embodiment the brush 30 has a partially cylindrical shaped recess 163 with outer walls 164 on contoured surface 158. Unlike the recess in FIG. 7, the recess in FIG. 8 is not of a hollow cylindrical shape but instead is of a solid cylindrical shape. The coil spring biasing member 26 engages either loosely with the outer walls 164 or engages tightly with an interference fit with the outer walls 164. It should be noted that, although embodiments disclosed herein describe specific shapes of the contoured surface 158, specifically cylindrical or grooves, it should be noted that alternate shapes may be used on the contoured surface 158 while still being covered by the scope of the present invention.

High contact area between the brush surface 150 and the rotatable conductor 58 may also improve the quality of the electrical contact. Consequently, the brushes 30 are manufactured with a brush surface 150 that is shaped to maximize surface contact with the rotatable conductor 58 at initial start of the machine. The cross sectional shape of the brushes 30 and the cavities 22, 142 are made noncircular to prevent rotation of the brushes 30 within the cavities 22, 142 to thereby present the brush surface 150 to the rotatable conductor 58 in the same orientation over time. This nonrotatable brush 30 feature also assures that a hole 170 in the brushes 30 into which the flexible conductors 34, 36 attach is properly oriented to minimize stress loading on the flexible conductors 34, 36 and the attachment points on either end of the conductors 34, 36.

Figure 9:
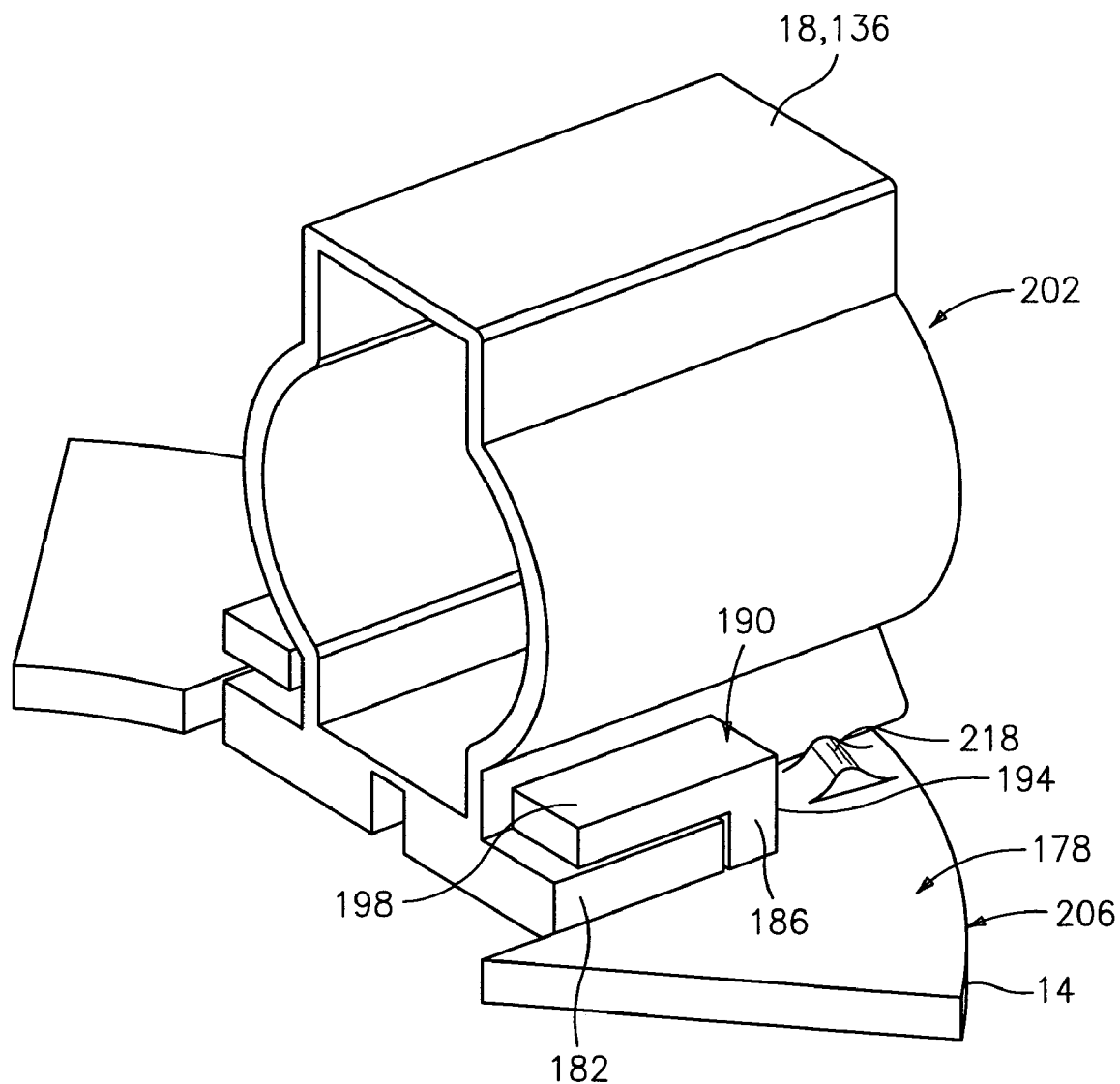
FIG. 9 depicts a perspective view of a brush to base plate assembly disclosed herein.

The ground flexible conductors 34 have one end electrically attached to the base plate 14 of the brush holder assembly 10 as shown in FIG. 1. The brush holders 18, 136 are also attached to the base plate 14. How the brush holders 18, 136 are attached to the base plate 14 is more easily seen in FIGS. 5, 6 and 9 with references now being made thereto. Each brush holder 18, 136 has a mounting surface 174 that slidably contacts a surface 178 on the base plate 14. Each brush holder 18, 136 also has a pair of protrusions 182 that project in opposite directions from the brush holders 18, 136 along the surface 174.

A plurality of tangs 186, formed in the base plate 14 in pairs, hold the protrusions 182 to the base plate 14. Each tang 186 is formed from a tab 190 that includes an axially directed portion 194 and a radially inwardly directed portion 198. Thus each tang 186 is radially inwardly open and radially outwardly closed. The axially directed portion 194 positions the radially inwardly directed portion 198 above the base plate surface 178 a distance substantially equal to the axial thickness of the protrusions 182. The brush holders 18, 136 are attached to the base plate 14 by sliding the brush holders 18, 136 radially outwardly while the surface 174 of the brush holders 18, 136 is butted against the surface 178 of the base plate 14 to thereby engage the protrusions 182 with the tangs 186. The distance between the two tangs 186 that form a pair is substantially equal to the distance across the each brush holder 18, 136 where the protrusions 182 protrude from the brush holder 18, 136, thereby locking the brush holders 18, 136 from moving circumferentially relative to the base plate 14.

The axially directed portion 194 of the tabs 190 form a stop to locate the brush holders 18, 136 in a radial position relative to the base plate 14 such that an outer surface 202 of the brush holders 18, 136 is generally aligned with an outer circumferential surface 206 of the base plate 14. The force of the biasing members 26 acting to urge the brushes 30 toward the rotatable conductor 58 is also acting to urge the brush holders 18, 136 radially outwardly. This radially outwardly directed force keeps the protrusions 182 in contact with the axially directed portion 194 of the tabs 190 to thereby positively locate the brush holders 18, 136 relative to the base plate 14. Additionally, the base plate 14 may include a flexible tab 210 that protrudes axially from the base plate 14 and engages with a notch 214 formed in the surface 174 of the brush holders 18, 136 to lock the brush holders 18, 136 to the base plate 14.

Additional retainment of the brush holder 18, 136 to the base plate 14 can be achieved by locating the brush holders 18, 136 between a pair of protuberances 218 that extend axially from the base plate 14 radially outwardly of the tabs 190. By positioning the protuberances 218 from one another a distance substantially equal to a width of the brush holder 18, 136 across the surface 174 the protuberances 218 may decrease vibrational movement in a side-to-side fashion.

Figure 10:
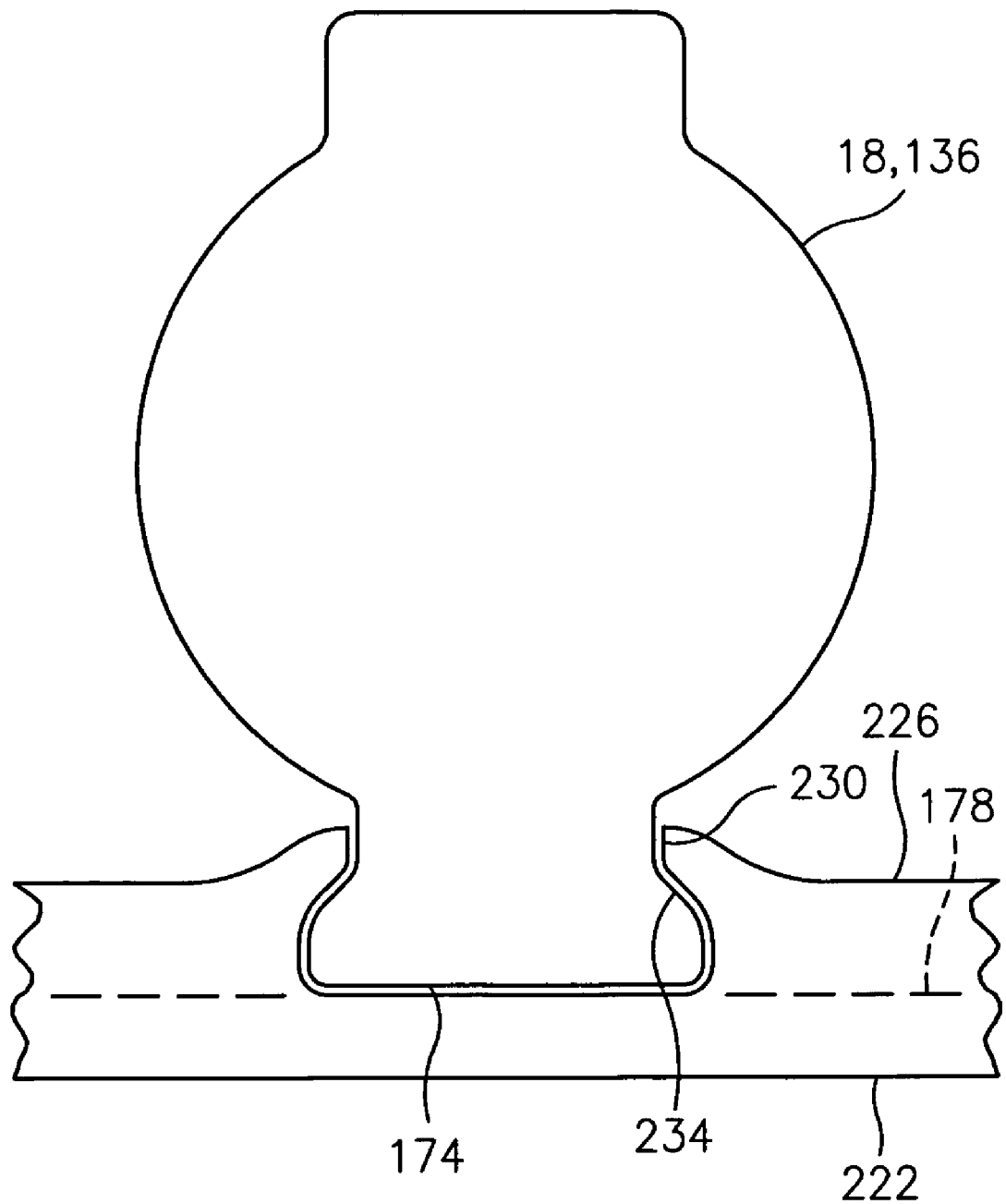
FIG. 10 depicts a radial view of a brush to base plate assembly disclosed herein.

Referring to FIG. 10 a view directed radially inwardly towards an alternate embodiment base plate 222 with the brush holder 18, 136 assembled thereon is depicted. The base plate 222 includes an axially projecting lip 226 extending from the surface 178 around at least a portion of the circumference of the base plate 222. The lip 226 has dovetail cutout portions 230 shaped to substantially complementarily match a dovetail portion 234 of the brush holders 18, 136. The dovetail cutout portions 230 in addition to providing retainment of the brush holders 18, 136 in a side-to-side fashion also provide retainment in and axial direction. That is, the radially outer most portion of the brush holder 18, 136 is held axially against the surface 178 by the engagement of the dovetail portion 234 with the dovetail cutout portion 230. Such retainment may aid in reducing vibration of the brush holders 18, 136 in an axial direction.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A dynamoelectric machine conductor, comprising:
an electric machine bus including a central portion;
a first electrically connectable site of the central portion connectable with a first flexible conductor;
a first arm that extends from the central portion having a second electrically connectable site connectable with a second flexible conductor;
a first at least one fused portion of the first arm having an orifice including a continuous outer boundary that defines, at least in part, first and second reduced cross sectional portions, the orifice extending through the first arm located between the first electrically connectable site and the second electrically connectable site, the first at least one fused portion being electrically interruptible to open a circuit between the first electrically connectable site and the second electrically connectable site;
a second arm that extends from the central portion, having a third electrically connectable site connectable with a third flexible conductor; and
a second at least one fused portion of the second arm having an orifice including a continuous outer boundary that defines, at least in part, first and second reduced cross sectional portions, the orifice extending through the second arm located between the first electrically connectable site and the third electrically connectable site, the second at least one fused portion being electrically interruptible to open a circuit between the first electrically connectable site and the third electrically connectable site.

2. The conductor of claim 1, wherein the bus is rigid.

3. The conductor of claim 1, wherein the bus is elongated.

4. The conductor of claim 1, wherein the bus is metal.

5. The conductor of claim 4, wherein the metal is a highly conductive alloy.

6. The conductor of claim 4, wherein the metal is copper or brass.

7. The conductor of claim 4, wherein the bus is plated.

8. The conductor of claim 1, wherein the at least one fused portions are electrically interruptible by melting due to current flow through the reduced cross sectional portions.

9. The conductor of claim 1, wherein the bus is sized and shaped so as to be formable by stamping.

10. The conductor of claim 1, wherein the orifice extending through at least one of the at least one fused portions is noncircular.

11. The conductor of claim 1, wherein the first and second at least one fused portions are configured to break with conduction of less current than the first or the second flexible conductor.

12. The conductor of claim 1, wherein the first and second at least one fused portions are configured to conduct a current that is less than a selected over current condition.

13. The conductor of claim 1, wherein the bus is connectable with the flexible conductor by welding.

14. The conductor of claim 1, wherein the bus is connectable with the flexible conductor by soldering.

15. The conductor of claim 1, wherein the bus is arcuate shaped.

16. The conductor of claim 15, wherein the first electrically connectable site is on a portion of the bus extending radially outwardly from the arcuate shape.

* * * * *